United States Patent [19]

Ichimura

[11] Patent Number: 5,032,915
[45] Date of Patent: Jul. 16, 1991

[54] APPARATUS FOR DETECTING POSITIVE AND NEGATIVE NOISE SIGNALS IN A VIDEO SIGNAL

[75] Inventor: Isao Ichimura, Kanagawa, Japan

[73] Assignee: Sony Corporation, Tokyo, Japan

[21] Appl. No.: 436,038

[22] Filed: Nov. 14, 1989

[30] Foreign Application Priority Data

Nov. 18, 1988 [JP] Japan .................. 63-291931

[51] Int. Cl.⁵ .............. H04N 5/208; H04N 5/94; H04N 5/91; H04N 5/14
[52] U.S. Cl. ................... 358/166; 358/336; 358/340
[58] Field of Search ............. 358/177, 336, 340, 313, 358/166, 167, 36, 37

[56] References Cited

U.S. PATENT DOCUMENTS

| 4,364,119 | 12/1982 | Gibson | 358/336 |
|---|---|---|---|
| 4,368,483 | 1/1983 | Lui | 358/166 |
| 4,384,306 | 5/1983 | Lui | 358/166 |
| 4,418,363 | 12/1983 | Kelleher | 358/340 |
| 4,492,988 | 1/1985 | Hashimoto et al. | 358/336 |
| 4,591,898 | 5/1986 | deBoer et al. | 358/336 |
| 4,719,522 | 1/1980 | Kaneko et al. | 358/313 |
| 4,805,040 | 2/1989 | Oku et al. | 358/336 |
| 4,835,758 | 5/1989 | Fujishima | 358/336 |
| 4,837,624 | 6/1989 | Heitmann et al. | 358/166 |
| 4,860,121 | 8/1989 | Gotoh | 358/336 |
| 4,890,169 | 12/1989 | Kobayashi et al. | 358/340 |
| 4,891,699 | 1/1990 | Hamada et al. | 358/336 |
| 4,893,192 | 1/1990 | Takemura | 358/336 |
| 4,939,577 | 7/1990 | Schreurs | 358/166 |
| 4,962,426 | 10/1990 | Naoi et al. | 358/166 |
| 4,977,460 | 12/1990 | Hirose | 358/336 |

FOREIGN PATENT DOCUMENTS

| 0031282 | 3/1981 | Japan | 358/336 |
|---|---|---|---|
| 0311672 | 12/1988 | Japan | 358/336 |

Primary Examiner—John K. Peng
Assistant Examiner—Jeffrey S. Murrell
Attorney, Agent, or Firm—Alvin Sinderbrand; William S. Frommer

[57] ABSTRACT

Apparatus for detecting noise signals, such as may be due to dropout, in a video signal includes a first detector for detecting positive and negative noise signals included in the positive portion of an input video signal, such as the video information portion, and a second detector for detecting positive and negative noise signals included in the negative portion of that video signal, such as the synchronizing signal portion. An output noise indication representing noise detected in the video and synchronizing portions of the input signal is produced as a function of the outputs from the first and second detectors.

6 Claims, 6 Drawing Sheets

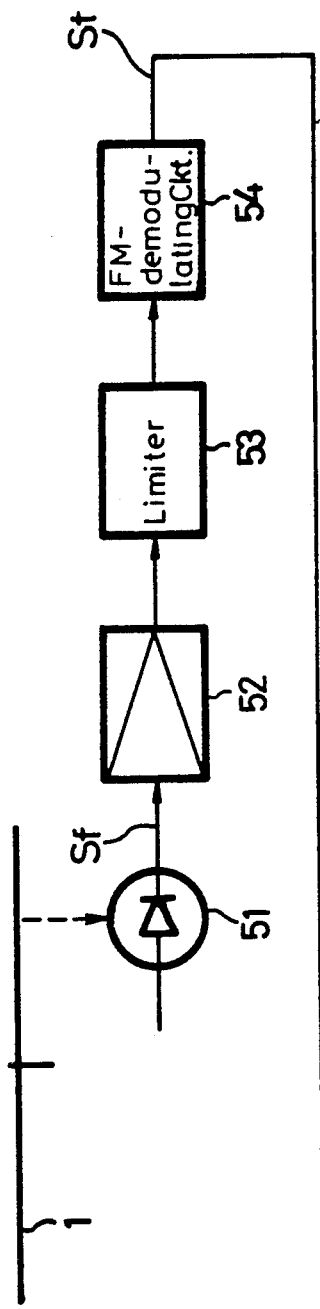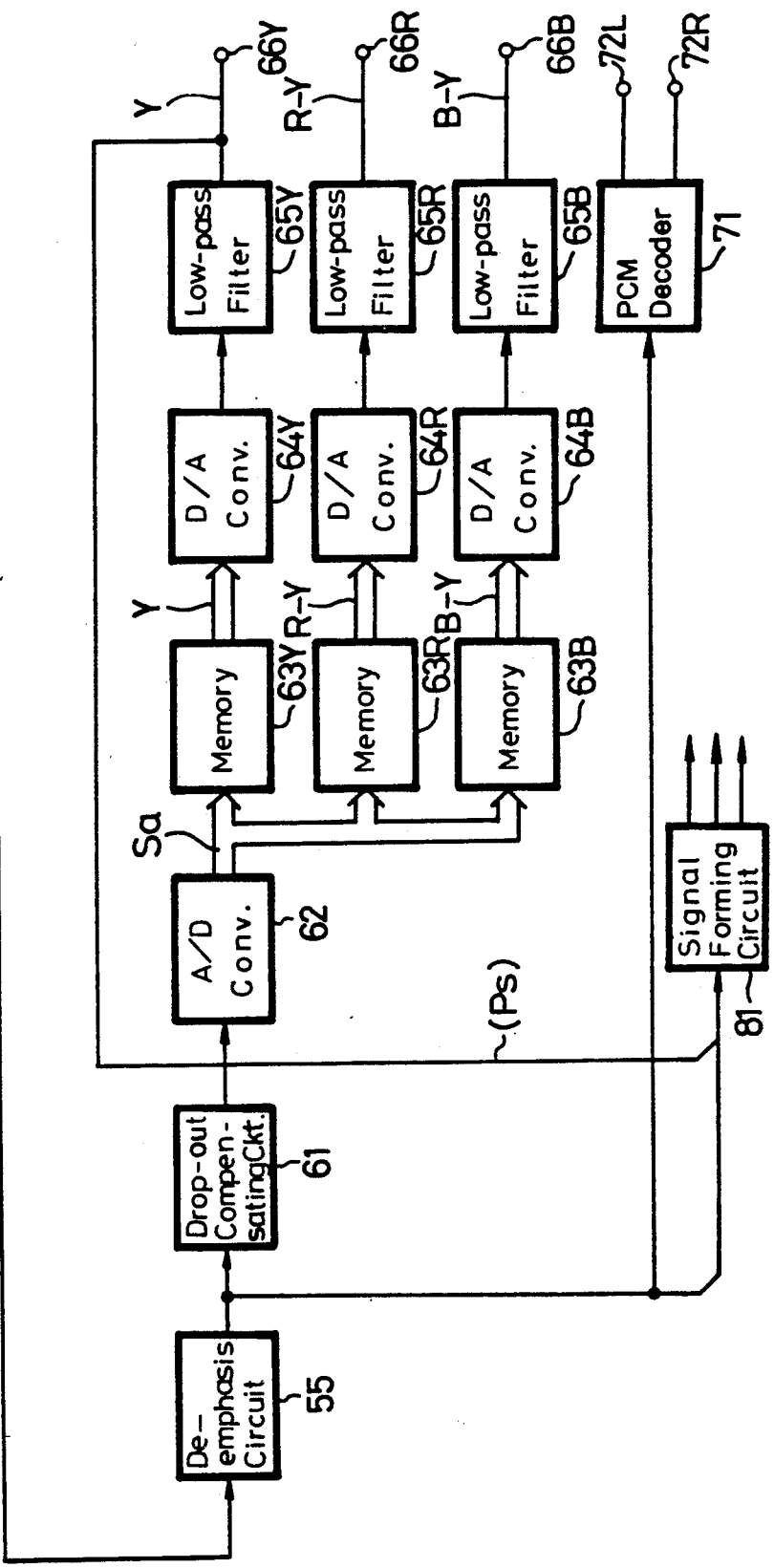
FIG. 2 (PRIOR ART)

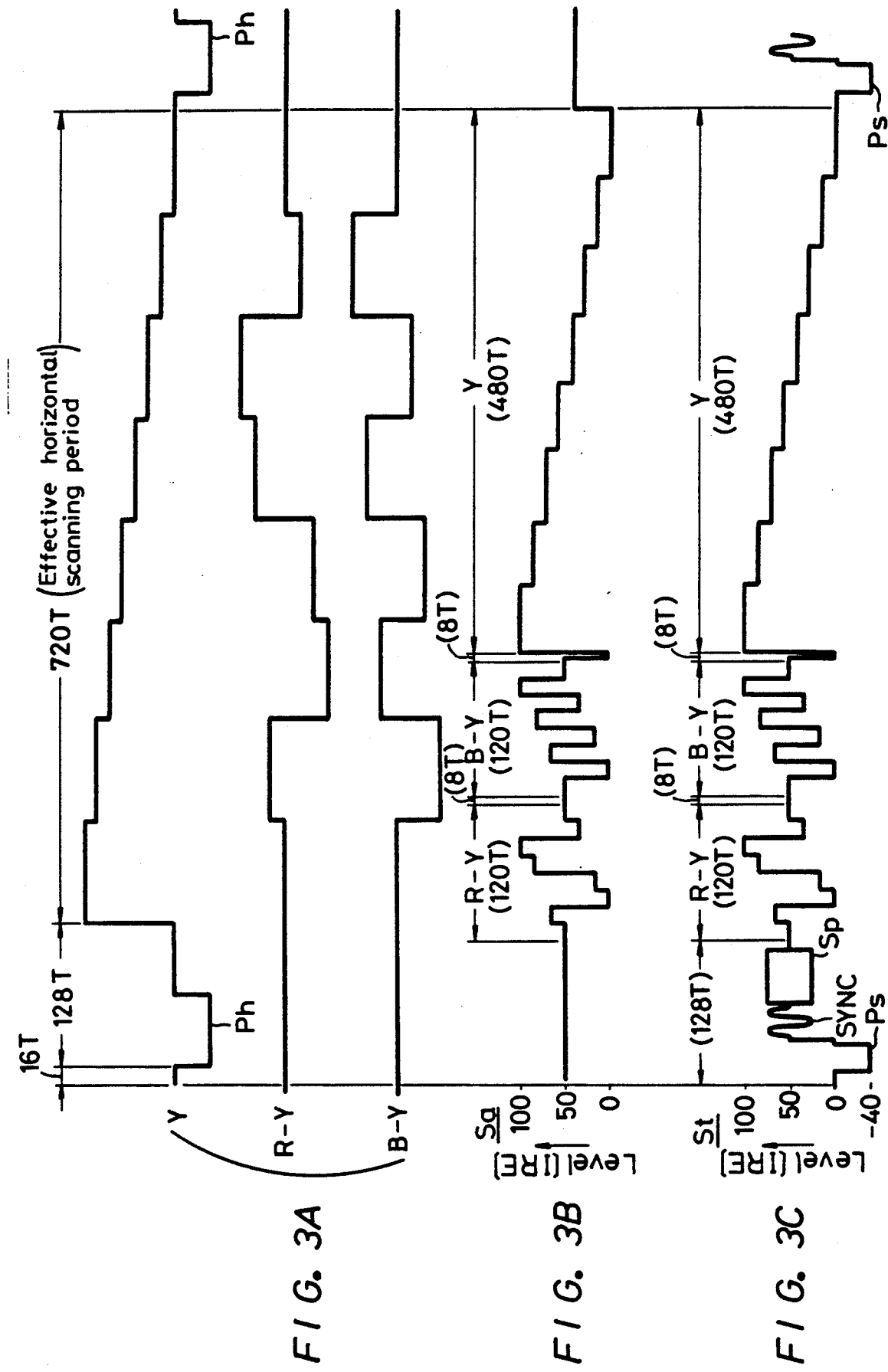

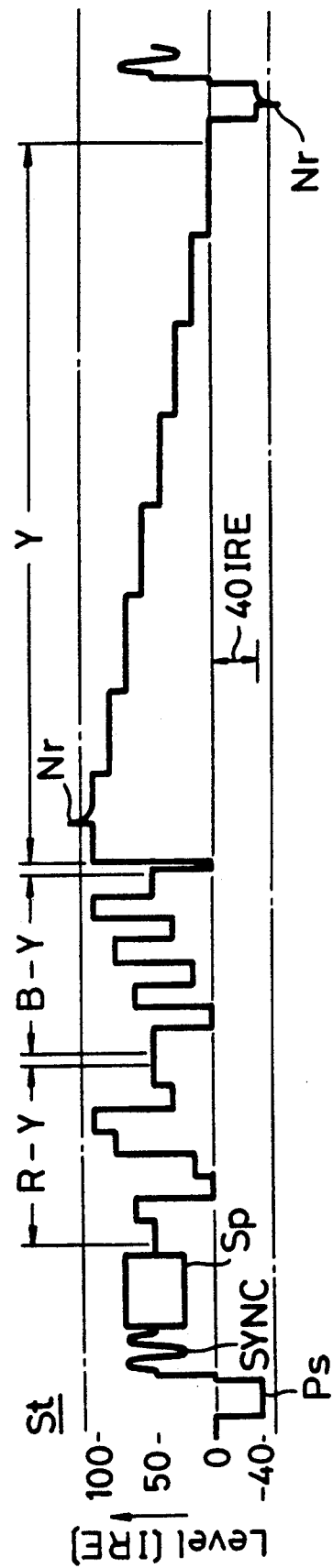

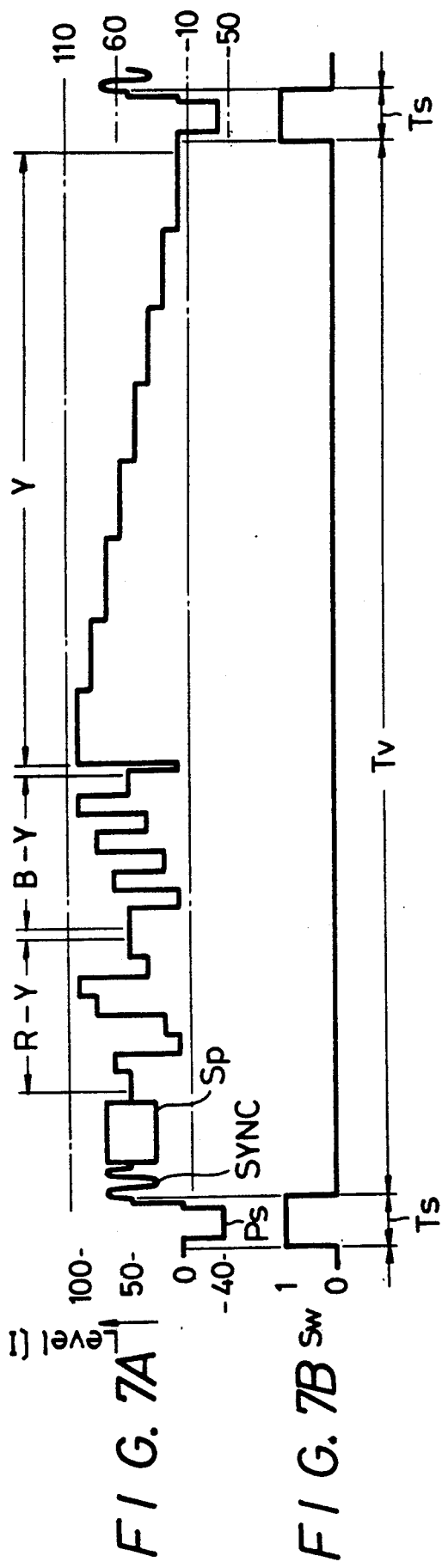

APPARATUS FOR DETECTING POSITIVE AND NEGATIVE NOISE SIGNALS IN A VIDEO SIGNAL

BACKGROUND OF THE INVENTION

1. Field of the Invention

This invention relates to noise detecting circuits and, more particularly, to such circuits by which dropouts in, for example, a video signal may be detected.

2. Description of the Prior Art

In video signal playback systems, such as optical disk apparatus, video information normally is recorded in digital form. In the event of signal drop-out during playback, digital techniques are used to simulate or compensate for the lost information. While dropout compensation techniques are known to those of ordinary skill in the art, they are not used unless and until a dropout is detected. A typical video recording system of the type that may be used with optical disk apparatus uses a frequency modulator to frequency modulate luminance, color difference, synchronizing and voice signal components. In one embodiment of a dropout detector, the omission or loss of one or more cycles of the FM signal is sensed as a reduction in the frequency of the reproduced video signal. If this reduced frequency falls below some threshold level, a dropout is indicated. However, if the frequency of the reproduced signal is too large, as may be due to irregular reflectivity of the video disk and which, nevertheless, should be interpreted as a dropout, this form of dropout detector does not operate satisfactorily. That is, dropouts which result in a substantial reduction in frequency may be detected, but dropouts which result in a substantial increase in frequency are not.

One embodiment of this type of FM dropout detector generates pulses in response to zero crossings of the reproduced FM signal. Another embodiment uses a "coring" circuit to produce pulses corresponding to the "core" of the FM signal. When these dropout detectors are used, a loss of one or more cycles in the FM signal is sensed either by a failure to detect zero crossings or a failure to detect a "core" of the FM signal.

Another type of dropout detector operates on the FM demodulated signal. The resultant composite video signal includes a synchronizing portion which, typically, includes a negative-going horizontal synchronizing pulse, and a video information portion which, typically, includes both luminance and chrominance components that are of generally positive polarity. Noise signals in the video information portion are detected by providing a whiter-than-white clipping level; and any signal which exceeds that clipping level is interpreted as a noise signal due to dropout. Similarly, noise signals in the horizontal synchronizing signal are detected by providing a negative clipping level greater than the maximum sync tip level that is expected. Any signal which exceeds this negative clipping level is interpreted as noise due to dropout.

While this technique relies upon a whiter-than-white clipping level and a negative clipping level to sense dropouts due to irregular reflectivity, dropouts which are present in the form of blacker-than-black pulses in the video information are not sensed unless such noise pulses are so large as to exceed the negative clipping level. Likewise, dropouts which produce positive-going noise pulses in the horizontal synchronizing pulse are not detected unless those noise pulses are so large as to exceed the whiter-than-white clipping level. As a consequence, there is a so-called dead band within which negative-going noise in the video information and positive-going noise in the synchronizing information are not sensed. Hence, dropout sensitivity is less than satisfactory.

OBJECTS AND SUMMARY OF THE INVENTION

Therefore, it is an object of the present invention to provide an improved noise detecting circuit which overcomes the aforementioned defects and disadvantages associated with previously proposed noise detecting and dropout sensing circuits.

Another object of this invention is to provide an improved noise detecting circuit in which dropout detecting sensitivity is improved.

A further object of this invention is to provide an apparatus for detecting noise signals which may be positive-going or negative-going in the video information portion of a video signal as well as noise signals which may be positive-going or negative-going in the synchronizing portion of the video signal.

An additional object of this invention is to provide improved noise detecting circuitry for detecting positive and negative noise in both the video portion and the synchronizing portion of a video signal so as to improve dropout compensation for that signal.

Various other objects, advantages and features of the present invention will become readily apparent from the ensuing detailed description, and the novel features will be particularly pointed out in the appended claims.

In accordance with this invention, apparatus is provided for detecting noise signals in a video signal, including a first detector for detecting both positive and negative noise signals included in the video information portion of the video signal and a second detector for detecting positive and negative noise signals included in the synchronizing information portion of the video signal, the outputs of these two noise detectors being used to produce an output noise indication representing both positive-going and negative-going noise in each of the video and synchronizing information portions.

As a feature of this invention, each detector defines a respective range and detects noise signals that are outside that range. Advantageously, the average values of these two ranges differ from each other.

As an aspect of this invention, each detector includes upper and lower level detectors which establish each range.

Preferably, the outputs of the respective detectors are supplied to a switching circuit that is changed over from one detector to the other, depending upon whether the video information or synchronizing information portion of the video signal is present.

BRIEF DESCRIPTION OF THE DRAWINGS

The following detailed description, given by way of example and not intended to limit the present invention solely thereto, will best be understood in conjunction with the accompanying drawings in which:

FIG. 2 is a block diagram of a prior art optical disk video reproducing system including a dropout compensating circuit;

FIGS. 3A-3C are waveform diagrams which illustrate the video signals that are recorded and reproduced by the optical disk apparatus shown in FIGS. 1 and 2;

FIGS. 4A and 4B illustrate signal waveforms which are useful in explaining prior art dropout detecting arrangements;

FIG. 5 illustrates the waveform of a video signal containing noise signals which may be due to dropout;

FIGS. 7A and 7B are waveform diagrams which are useful in understanding the operation of the present invention.

DETAILED DESCRIPTION OF A PREFERRED EMBODIMENT

Figure 1:
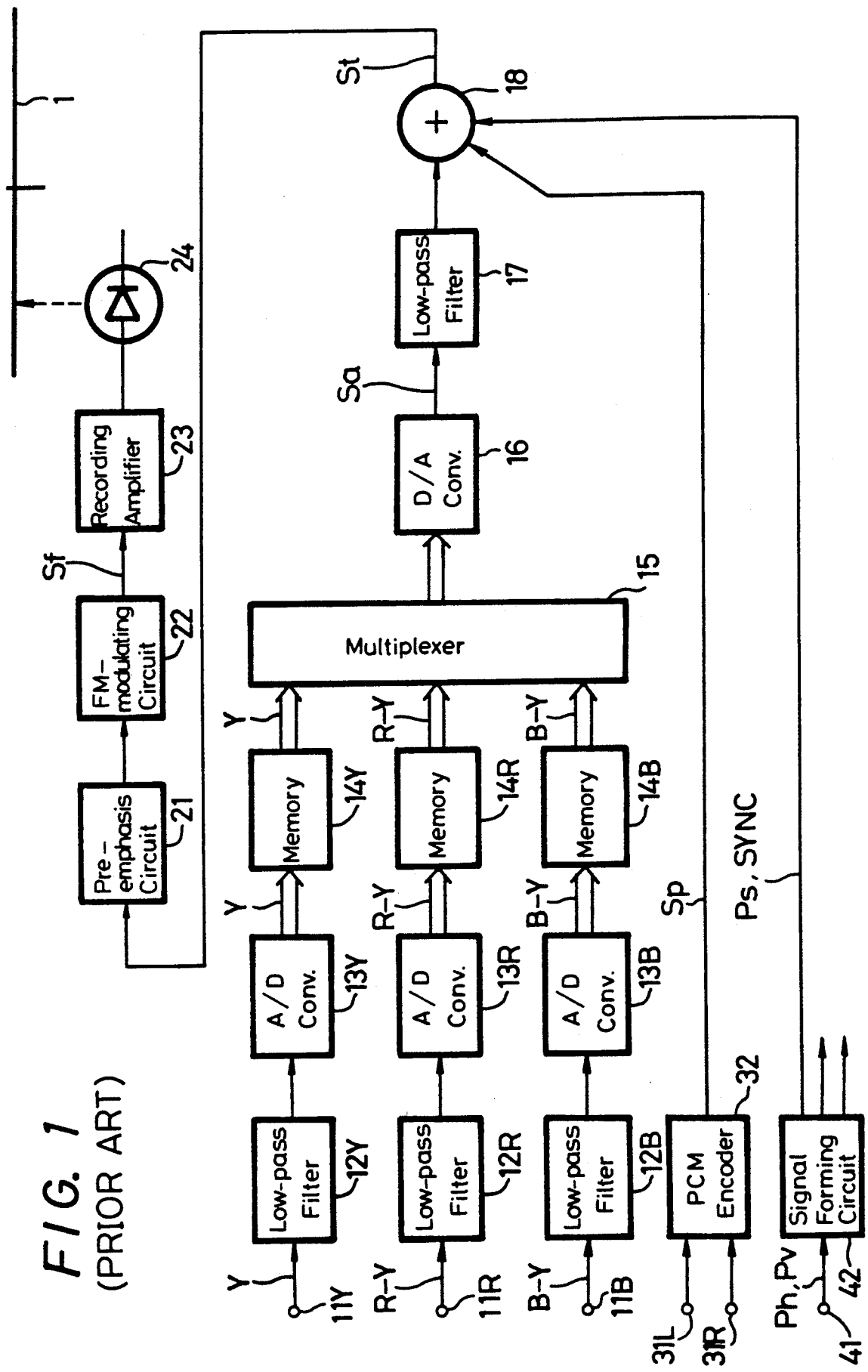
FIG. 1 is a block diagram of a prior art optical disk video signal recording system in which the video signal, when played back, may be subjected to dropout.

Before describing the present invention, reference first is made to the video signal recording and reproducing apparatus shown in FIGS. 1 and 2 in which video signals are recorded on and reproduced from an optical disk. The recording apparatus of FIG. 1 assumes that the composite color video signal supplied thereto is separated into its luminance component Y, its red and blue color difference components R-Y and B-Y and its horizontal and vertical synchronizing pulses Ph and Pv. These signals are supplied to input terminals 11Y, 11R, 11B and 41, as shown. The luminance component Y is filtered by a low pass filter 12Y, converted from analog to digital form by an analog-to-digital (A/D) converter 12Y and stored in a digital memory 14Y. Low pass filter 12Y exhibits a cutoff frequency of, for example, 5MHz. In one embodiment, A/D converter 13Y is supplied with a sampling signal exhibiting a sampling frequency of 864 fh, wherein fh is the horizontal frequency. Thus, each horizontal line interval of the luminance signal Y is represented by 864 samples. Of these, 720 samples represent useful video information. Accordingly, 720 samples are written into memory 14Y, and the write period may be expressed as 720T, where T is the period of a sampling pulse, or T=1/864(fh).

The red color difference signal R-Y is filtered by a low pass filter 12R having a cutoff frequency on the order of 1.25MHz, or one-fourth the cutoff frequency of low pass filter 12Y. The filtered red color difference component is digitized by A/D converter 13R which is supplied with sampling signals having a frequency that is one-fourth the frequency at which the luminance component Y is sampled. Thus, the sampling frequency of A/D converter 13R is on the order of 216 fh. The samples which are produced during the period 720T, or 180 samples, are written into memory 14R from A/D converter 13R.

In a similar manner, the blue color difference component B-Y is filtered by low pass filter 12B having a cutoff frequency on the order of about 1.25MHz. This filtered blue color difference component is digitized by A/D converter 13B having the same sampling rate as A/D converter 13R. The digitized blue color difference component is written into memory 14B during the period 720T. Like the digitized red color difference component, 180 samples of the blue color difference component are written into memory 14B.

Memories 14Y, 14R and 14B are adapted to timebase compress the luminance and color difference components stored therein. Each memory may be of the so-called first-in first-out (FIFO) type. The digitized samples of the luminance component Y are read from memory 14Y at a read-out rate that is 1.5 times the write-in rate. Thus, the 720 samples in a line interval of the luminance component are timebase compressed from a period of 720T to a period of 480T (720T/1.5=480T).

Each of memories 14R and 14B is read out at a rate that is six times the write-in rate. Hence, the samples of the red color difference component R-Y are timebase compressed from an initial period of 720T to a read-out period of 120T (720T/6=120T). Similarly, the blue color difference component read from memory 14B is timebase compressed to a period of 120T.

FIG. 3A illustrates the sampled luminance component Y, the sampled red color difference component R-Y and the sampled blue color difference component B-Y. FIG. 3A further illustrates the write-in period of 720T for each of memories 14Y, 14R and 14B. It is appreciated that the horizontal synchronizing interval of period 128T and the front porch period of 16T are not stored in memory 14Y.

FIG. 3B illustrates the luminance component Y' read from memory 14Y, timebase compressed to a read-out period of 480T. Likewise, the blue color difference component (B-Y)' read from memory 14B is timebase compressed to a period of 120T and the red color difference component (R-Y)' is read from memory 14R and is timebase compressed to a period of 120T. FIG. 3B also illustrates the signal level in IRE units of the luminance and color difference components that are read from memories 14Y, 14R and 14B. It will be appreciated that, for simplification, FIG. 3B illustrates the analog values of the digital signals which are read from the memories. In practice, of course, digital samples are read from each memory.

The timebase compressed luminance component Y' read from memory 14Y, the timebase compressed red color difference component (R-Y)' read from memory 14R and the timebase compressed blue color difference component (B-Y)' read from memory 14B are supplied to a multiplexer 15. The multiplexer operates to read, in sequence, memory 14R, then memory 14B and then memory 14Y, and imparts a delay period on the order of 8T between the reading of successive memories. As a result, relatively narrow spacing is provided between the red color difference component and the blue color difference component and between the blue color difference component and the luminance component. FIG. 3B illustrates the order in which these memories are read by multiplexer 15.

As mentioned above, FIG. 3B illustrates analog video signal components; but in practice, multiplexer 15 is supplied with digital samples read from memories 14R, 14B and 14Y. These digital samples are supplied to a digital-to-analog (D/A) converter 16 which produces a time division analog signal Sa of the type shown in FIG. 3B. Thus, during each horizontal line interval, D/A converter 16 produces a blank portion of duration 128T, followed by the red color difference component (R-Y)' of duration 120T, followed by a spacing of 8T, followed by the blue color difference component (B-Y)' of period 120T, followed by a spacing of 8T, followed by the luminance component Y' of period 480T. As is conventional, the maximum white level of the video information is represented as 100 IRE units and the maximum black level is represented as 0 IRE units. This time division analog signal Sa is filtered by a low pass filter 17 having a cutoff frequency on the order of about 7.5MHz; and the filtered signal is supplied to a combining circuit 18.

Combining circuit 18, which may be an adding circuit, is coupled to a signal forming circuit 42 to which the horizontal and vertical synchronizing signals Ph and Pv are supplied. Signal forming circuit 42 is adapted to produce a negative-going horizontal synchronizing pulse Ps from, for example, 0 IRE units −40 IRE units, together with a synchronizing signal SYNC which may be, for example, a burst signal. The horizontal synchronizing pulse Ps and the synchronizing signal SYNC are illustrated in FIG. 3C and are added to the time division analog video signal Sa during the blank portion 128T, as shown. Thus, a pedestal level of zero IRE units and a SYNC tip level of −40 IRE units are produced by the signal forming circuit and inserted into the time division analog video signal Sa.

Combining circuit 18 also is coupled to a PCM encoder 32 which receives left-channel and right-channel audio signals and encodes these audio signals into PCM format. The resultant PCM audio signal Sp is supplied to combining circuit 18 and is inserted into the blank portion 128T of the time compressed video signal after the synchronizing signal SYNC and before the red color difference signal (R-Y)', as illustrated in FIG. 3C. Thus, the PCM audio signal Sp is inserted into the horizontal blanking interval and does not interfere with the synchronizing information or the video information portion of the time division video signal.

Combining circuit 18 produces a time division composite signal St comprised of the horizontal synchronizing pulse Ps, the synchronizing signal SYNC, the PCM audio signal Sp, the time compressed red color difference component (R-Y)', the time compressed blue color difference component (B-Y)' and the time compressed luminance component Y', all within the duration of a conventional horizontal period. It is seen from FIG. 3C that the level of the synchronizing signal SYNC and the PCM audio signal Sp is within the range of 25 IRE units to 75 IRE units and is centered at the 50 IRE unit level. This time division composite signal St is coupled through a preemphasis circuit 21 to a frequency modulating circuit 22. The resultant FM signal Sf exhibits a relatively lower frequency when the time division composite signal St is at a relatively lower level, and exhibits a higher frequency when the time division composite signal is at a higher level. The frequency modulated time division composite signal is supplied through a recording amplifier 23 to an optical head 24 to modulate a light beam, such as a laser beam, imaged onto an optical disk 1. Thus, the FM signal Sf is recorded on optical disk 1 to form a spiral track thereon.

The recorded FM signal is reproduced from optical disk 1 by the playback apparatus shown in FIG. 2. It will be appreciated that the particular disk which is used for a playback operation need not be the very same disk that was used for the recording operation. For example, the optical disk on which the FM signal Sf is recorded may be a master disk from which several copies of the playback disk are produced. Nevertheless, for convenience, FIG. 2 illustrates an optical disk 1 from which the recorded video signals are reproduced.

The reproducing apparatus recovers an FM modulated signal Sf by means of an optical head 51 which may be of conventional construction. This recovered FM signal Sf is amplified by an amplifier 52, amplitude-limited by a limiter 53 and demodulated by an FM demodulator 54 to produce a time division analog signal St of the type illustrated in FIG. 3C. This time division analog signal St is deemphasized by deemphasis circuit 55 and supplied through a dropout compensating circuit 61 to an A/D converter 62. As will be described below, the purpose of the dropout compensating circuit is to detect and compensate for noise signals which may be present in the video signal and which would obliterate video or synchronizing information. It is assumed that such noise signals are attributed to dropout, including dropout caused by irregular reflectivity of the optical disk. Of course, when dropout is sensed, conventional compensating techniques may be used to correct for lost information A/D converter 62 is adapted to convert the time division analog video signals shown in FIG. 3C to digital form. The resultant, digitized time compressed luminance component Y', blue color difference component (B-Y)' and red color difference component (R-Y)' are written into memories 63Y, 63B and 63R, respectively.

These memories are similar to aforedescribed memories 14 shown in FIG. 1, in that they are FIFO-type memory devices. Memory devices 63Y, 63R and 63B are adapted to timebase expand the luminance and color difference signals stored therein. Thus, the read-out rate of each of these memories is less than the write-in rate thereof. Consequently, the original timebase of each of the luminance component Y, red color difference component R-Y and blue color difference component B-Y is restored. These components, with their original timebases, are converted to analog form by D/A converters 64Y, 64R and 64B, respectively. The resultant, analog luminance component Y is filtered by a low pass filter 65Y and supplied to an output terminal 66Y. Similarly, the analog red color difference component R-Y is filtered by low pass filter 65R and applied to output terminal 66R, while the analog blue color difference component B-Y is filtered by low pass filter 65B and supplied to output terminal 66B. These analog video components are used by other circuitry (not shown) to produce a composite color video signal, such as an NTSC signal.

A signal forming circuit 81 is coupled to the output of deemphasis circuit 55 and is adapted to derive the usual horizontal and vertical synchronizing signals and also to produce therefrom various timing signals for controlling the A/D and D/A converters and memory devices. The filtered luminance component Y produced by low pass filter 65Y also is supplied to signal forming circuit 81 for use in recovering the synchronizing and timing signals.

PCM decoder 71 is coupled to the output of deemphasis circuit 55 and uses the timing signals from circuit 81 to decode the left-channel and right-channel audio signals from the PCM encoded audio signal Sp included in the time division analog signal St reproduced from the optical disk. The recovered analog audio signals are applied to output terminals 72L and 72R, respectively.

As mentioned above, dropouts in the signals reproduced from the optical disk are detected and compensated by dropout compensating circuit 61. The precise location of this circuit in the signal path varies with the type of dropout detection and compensation that may be employed. Typical examples of dropout detection now are described.

In one technique, dropouts in the reproduced FM signal Sf are detected. As shown in FIG. 4A, the reproduced FM signal normally crosses a reference axis, such as the illustrated zero axis, unless dropouts are present. FIG. 4A illustrates a dropout of one cycle of the reproduced FM signal. By reason of the absence of this cycle, the frequency of the reproduced FM signal appears to be reduced, for example, by a factor of one-half. Accordingly, by providing a simple frequency detector, dropouts are sensed when the frequency of the FM signal falls below a predetermined frequency. It will be recognized that this predetermined frequency is less than that which represents the sync tip level of the horizontal synchronizing pulse Ps.

In another type of dropout detector, a reproduced FM signal is supplied to a coring circuit which senses signals between threshold levels represented by the broken lines in FIG. 4A. The output of such a coring circuit is illustrated in FIG. 4B. If the frequency of the cored signal shown in FIG. 4B is detected, a dropout is sensed when the detected frequency is less than a predetermined value, as will occur when dropout prevents the FM signal from reaching the prior amplitude to be sensed by the coring circuit.

In accordance with another technique for detecting dropout, the dropout detector is supplied with the time division analog signal St, as may be provided by deemphasis circuit 55 and as illustrated in FIG. 5. Here, dropout is detected by sensing noise signals Nr which exceed the maximum white level of 100 IRE units or which exceed (i.e. are more negative than) the sync tip level of $-40$ IRE units. For example, the time division analog signal St may be compared to a positive clipping level which exceeds 100 IRE units and a negative clipping level which is more negative than $-40$ IRE units. If the analog signal St exceeds either clipping level, such as illustrated in FIG. 5, dropout is detected.

As mentioned above, dropout detectors which sense a reduction in frequency of the FM signal will not detect dropout in the event that the frequency increases, as may be due to irregular reflectivity of the optical disk.

Likewise, and as also mentioned above, the dropout detector which uses whiter-than-white and negative clipping levels to detect noise signals may not detect dropout due to negative noise in the video information, that is, blacker-than-black pulses, which may not be more negative than the negative clipping level; nor will positive noise superimposed onto the horizontal synchronizing signal be detected if that noise does not exceed the whiter-than-white clipping level. Thus, noise due to dropout in either the video or synchronizing information portion of the time division analog video signal having the general waveform shown in FIG. 5 may not be sensed. The present invention overcomes this lack of sensitivity in detecting dropouts that may be blacker-than-black in the video information portion or may be lighter-than-black in the synchronizing information portion of the video signal. Stated otherwise, the present invention detects negative-going noise that may be superimposed on the video information portion of the video signal as well as positive-going noise which may be superimposed onto the synchronizing information portion.

Figure 6:
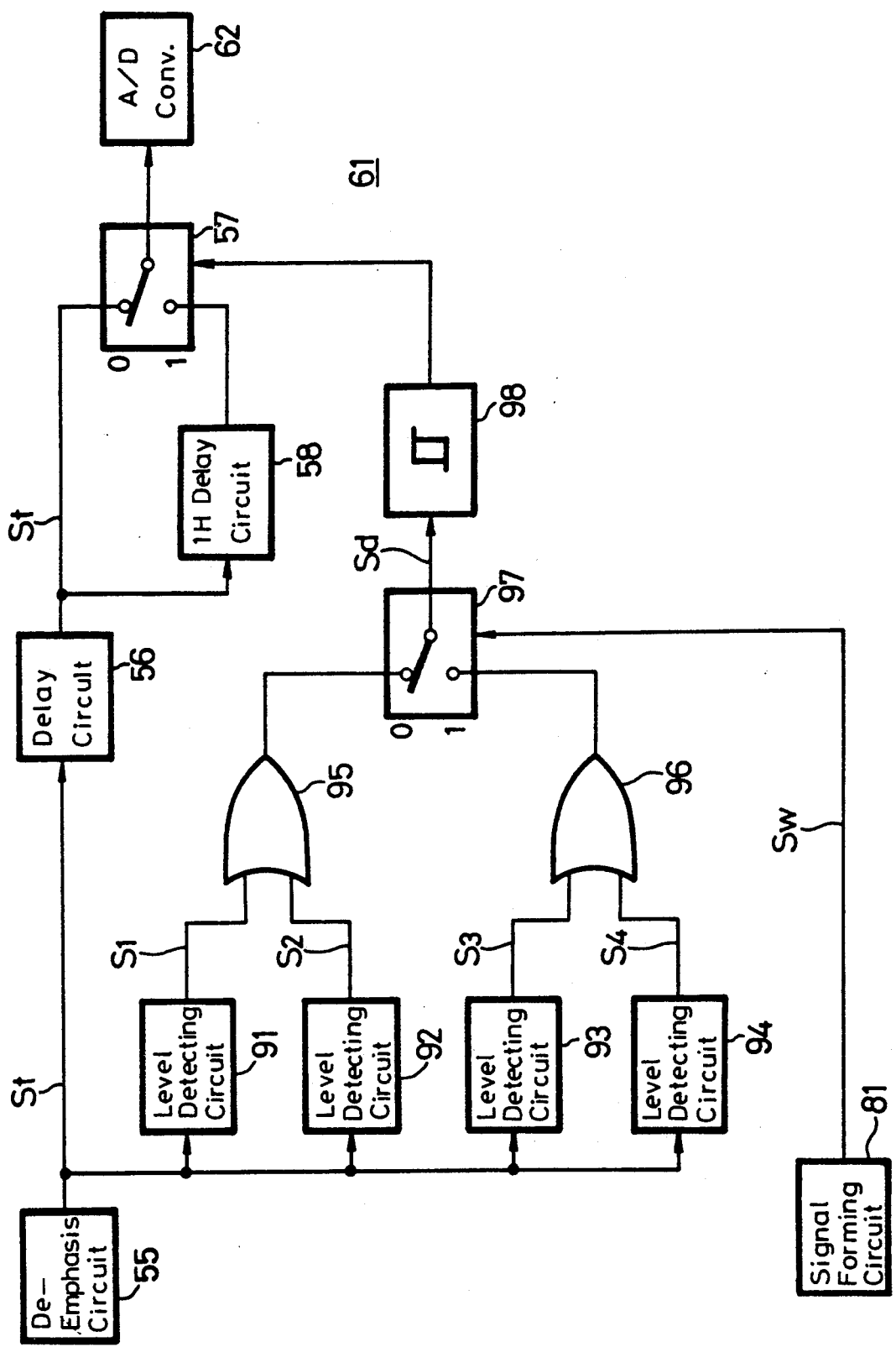
FIG. 6 is a block diagram of one embodiment of the present invention.

Turning now to FIG. 6, there is illustrated one embodiment of a noise detector which may be used to detect dropouts in the video signal reproduced by the apparatus shown in FIG. 2. Preferably, this noise detector is used to implement dropout compensating circuit 61 of FIG. 2.

The illustrated noise detector includes level detecting circuits 91, 92, 93 and 94 and a switch circuit 97. The level detecting circuits are coupled to the output of deemphasis circuit 55 to receive the time division analog video signal St which is reproduced from optical disk 1 and FM demodulated. Each level detecting circuit is provided with a respective threshold level against which the video signal level is compared. As a numerical example, level detecting circuit 91 is provided with a threshold level on the order of about 110 IRE units and level detecting circuit 92 is provided with a threshold level on the order of about $-10$ IRE units. The purpose of level detecting circuits 91 and 92 is to define a range within which the video information portion of the analog video signal St is expected to fall. If the signal level of the video signal St is outside this range, one or the other of level detecting circuits 91 and 92 produces an output signal S1 or S2, respectively, indicative thereof. Thus, if the video signal St exceeds the threshold level 110 IRE units, level detecting circuit 91 produces output signal S1. On the other hand, if the signal level of the video signal St is more negative than the threshold level $-10$ IRE units, level detecting circuit 92 produces output signal S2. An OR gate 95 couples output signals S1 and S2 to one input of switch circuit 97.

In a similar manner, level detecting circuits 93 and 94 define a range within which the horizontal synchronizing information is expected to fall. If the horizontal synchronizing information includes noise signals outside this range, an output signal indicative thereof is produced. Accordingly, level detecting circuit 93 is provided with a threshold level on the order of about 60 IRE units; and if the signal level of the synchronizing information portion of video signal St exceeds this threshold, an output signal S3 is produced. Level detecting circuit 94 is provided with a negative threshold level of about $-50$ IRE units such that if the signal level of the synchronizing information portion of video signal St is more negative than this threshold, output signal S4 is produced. An OR gate 96 couples output signals S3 and S4 to another input of switch circuit 97.

The switch circuit is illustrated schematically as (but is not limited to) a mechanical switch under the control of a switch control signal Sw produced by signal forming circuit 81. FIG. 7B illustrates a typical waveform of the switch control signal; and it is seen that this signal is a pulse of duration Ts at least coextensive with the synchronizing information portion of the analog video signal St. It is observed that, during the video information portion Tv of the video signal St, the switch control signal Sw exhibits a relatively low level, shown as a logic "0". However, during the synchronizing information portion Ts of the video signal, the switch control signal Sw exhibits a relatively high level, shown as a logic "1". Switch 97 passes the output of OR gate 95 when switch control signal Sw is a logic "0" and passes the output of OR gate 96 when the switch control signal is a logic "1".

The output of switch circuit 97 is a noise signal indication Sd, and this signal is applied through a waveform shaping circuit 98 as a control signal to yet another switch circuit 57. Switch circuit 57 functions to replace a portion or all of a line interval of the video signal St with a compensated signal if dropout is detected in that line interval. For example, if a line interval contains dropout, the preceding line interval which, presumably, does not contain dropout, is substituted therefor. This substitution is carried out by a 1H delay circuit 58, wherein H is a period equal to a horizontal line interval. The output of deemphasis circuit 55 is coupled directly to one input of switch circuit 57 and is coupled to another input thereof by way of 1H delay circuit 58. To avoid or at least minimize errors that may be due to time delays included in level detecting circuits 91-94 or in switch circuit 97, a delay circuit 56 is provided at the output of deemphasis circuit 55. The purpose of delay circuit 56 is to match the inherent delays that may be present in level detecting circuits 91-94 and switch circuit 97.

The output of switch circuit 57 is coupled to A/D converter 62 which digitizes the dropout-compensated video signal St.

In operation, during the video information portion Tv of the time division, timebase compressed analog video signal St, the video signal level is compared to the positive and negative threshold levels of level detecting circuits 91 and 92. Level detecting circuits 93 and 94 also may operate at this time; but since switch circuit 97 couples the output of OR gate 95 to waveform shaping circuit 98, whatever signal may be produced by OR gate 96 is, at this time, not relevant. If a noise signal which exceeds 110 IRE units or which is more negative than −10 IRE units is superimposed onto the video information portion of the video signal, as may be due to dropout, OR gate 95 supplies an output signal, such as a logic "1" through waveform shaping circuit 98 to switch circuit 57 Normally, in the absence of any detected noise (or dropout), the video signal St produced by deemphasis circuit 55 is coupled through switch circuit 57 to A/D converter 62. However, if noise is detected, the output signal produced by OR gate 95 changes over switch circuit 57 to couple the output of 1H delay circuit 58 to the A/D converter. Thus, when dropout is detected in a particular horizontal line interval, that portion of the immediately preceding line interval, or the entire preceding line interval, is substituted therefor; and the substituted signals of this preceding line interval are supplied in place of the defective line interval to A/D converter 62. Hence, dropout which may be present in the timebase compressed red color difference component (R-Y)' or in the timebase compressed blue color difference component (B-Y)' or in the timebase compressed luminance component Y' is compensated by replacing the line interval (or defective portion) in which that dropout is present with a preceding line interval (or portion) which is free of dropout.

Now, during the synchronizing information portion of the video signal St, the switch control signal Sw of FIG. 7B changes over switch circuit 97 to couple the output of OR gate 96 to waveform shaping circuit 98. In this condition, if the signal level of the synchronizing information portion of the video signal exceeds the threshold level of 60 IRE units or is more negative than the threshold level of −50 IRE units, OR gate 96 supplies an output signal Sd which is used to change over switch circuit 57. In the absence of this output signal, the synchronizing signal then present in the synchronizing information portion of the video signal St is supplied through switch circuit 57 to A/D converter 62. However, when level detecting circuits 93 or 94 detect noise superimposed onto the synchronizing information of the video signal St, switch 57 couples the output of 1H delay circuit 58 to A/D converter 62. Hence, if the synchronizing information portion of the video signal contains noise due to dropout, that segment of the synchronizing information portion is replaced by a similar, preceding, noise-free segment. Consequently, a dropout compensated time division video signal is supplied to the A/D converter.

In the embodiment described in conjunction with the waveform shown in FIG. 7A, level detecting circuits 91 and 92 comprise, in combination, a range defining circuit having an average value equal to 50 IRE units. Similarly, level detecting circuits 93 and 94 comprise, in combination, another range defining circuit having an average value of 5 IRE units. It is appreciated that the average value of the range within which the video information portion of the video signal St is expected is higher than the average value of the range within which the synchronizing information portion is expected.

While the present invention has been particularly shown and described with reference to a preferred embodiment, it will be readily appreciated by those of ordinary skill in the art that various changes and modifications may be made without departing from the spirit and scope of the invention. For example, it has been assumed herein that the video information portion of the video signal St exhibits relatively positive signal levels (i.e. >0 IRE units) and the synchronizing information portion exhibits relatively negative signal levels. Should the video signal be recorded with opposite polarities, then noise signals in the synchronizing information portion may be detected by comparing that portion of the video signal to threshold levels of, for example +50 and −60 IRE units. Likewise, noise signals in the video information portion may be detected by comparing that portion with threshold levels ranging from +10 IRE units to −110 IRE units. Of course, other suitable numerical examples may be used.

Still further, rather than using switch 97 to change over between output signals produced by OR gates 95 and 96, the present invention may proceed by eliminating level detecting circuits 93 and 94 and OR gate 96; and by using a switching arrangement to change the threshold levels to which the video signal St is compared during the synchronizing and video information portions. For example, level detecting circuit 91 may be provided with the threshold level 110 IRE units and level detecting circuit 92 may be provided with the threshold level −10 IRE units during the video information portion of the video signal. When the synchronizing information portion is present, the threshold levels supplied to level detecting circuits 91 and 92 may be changed to +60 IRE units and −50 IRE units, respectively.

Still further, different threshold levels may be supplied to the respective level detecting circuits during discrete intervals, or portions of the video signal St. For example, one set of threshold levels may be supplied to level detecting circuits 91 and 92 when the time compressed luminance component Y' is present, and still other threshold levels may be supplied to the level detecting circuits during those intervals that the blue and/or red color difference components are present. Thus, dropout sensitivity may be adjusted for different information included in the video signal.

Additionally, the present invention need not be limited solely to the numerical example shown in FIG. 7A. That is, the noise detecting range for noise signals superimposed onto the video information portion of the video signal need not be limited solely to a range that is 20 IRE units greater than the expected range within which the video information normally resides.

As yet another alternative to the aforedescribed embodiment, dropout compensating circuit 61 need not be provided with switch circuit 57 and 1H delay circuit 58. Rather, in the event that dropout is detected, a write-in operation for memories 63 can be suspended, whereby previously stored information is not overwritten with dropout data. Rather, the previously stored information simply is re-read from the memory.

It is intended that the appended claims be interpreted as including the particular embodiment described herein, the modifications suggested hereinabove and all equivalents thereto.

What is claimed is:

1. Apparatus for detecting noise signals in a video signal, comprising: input means for supplying an input video signal having a video information portion and a synchronizing portion, one of said video information and synchronizing portions is positive and includes substantially positive signals and the other of said portions is negative and includes negative signals; first detecting means coupled to said input means and defining a first range for detecting positive and negative noise signals outside said first range and included in said positive portion of the video signal; second detecting means coupled to said input means and defining a second range for detecting positive and negative noise signals outside said second range and included in said negative portion of the video signal; and output means coupled to said first and second detecting means for producing an output noise indication representing noise detected in said positive portion and noise detected in said negative portion of the input video signal.

2. The apparatus of claim 1 wherein said first range has a first average value; and said second range has a second average value less than said first average value.

3. The apparatus of claim 2 wherein said first range is from about −10 IRE units to about 110 IRE units, and said second range is from about −50 IRE units to about 60 IRE units.

4. The apparatus of claim 2 wherein each of said detecting means comprises upper and lower level detectors, said upper level detector detecting when a signal level of a respective portion of the video signal exceeds a predetermined upper level and said lower level detector detecting when a signal level of said respective portion of the video signal is less than a predetermined lower level, the upper and lower predetermined levels of the level detectors in the first detecting means differing from the upper and lower predetermined levels of the level detectors in the second detecting means.

5. The apparatus of claim 4 wherein said output means comprises switch means for receiving outputs from said first detecting means when the signal level of the positive portion of the video signal is outside said first range and for receiving outputs from said second detecting means when the signal level of the negative portion of the video signal is outside said second range; and switch control means for generating a switch control signal when the respective positive and negative portions of the video signal are present for changing over said switch means from receiving outputs from said first detecting means to receiving outputs from said second detecting means.

6. The apparatus of claim 5 wherein said negative portion of the video signal contains horizontal synchronizing signals; and said switch control means comprises synchronizing signal sensing means for sensing a horizontal synchronizing signal to change over said switch means.

* * * * *